Patented Jan. 5, 1954

2,665,217

UNITED STATES PATENT OFFICE 2,665,217

METHOD FOR CONTROLLING MOLD AND DECAY ON FRESH FRUITS AND VEGETABLES

Lloyd J. Meuli, Long Beach, Calif., assignor to The Dow Chemical Company, Midland, Mich., a corporation of Delaware No Drawing. Application September 5, 1952, Serial No. 308,159

3 Claims. (Cl. 99—154)

The present invention relates to a method for the treatment of fresh fruits and vegetables to suppress the development of mold and decay.

The expression "fresh fruits and vegetables" as herein employed refers to such produce as lemons, oranges, grapefruit, apples, pears, peaches, plums, celery, potatoes, tomatoes, yams, and the like. The invention is particularly concerned with the treatment of citrus fruits and especially oranges.

Fresh fruits and vegetables, after harvesting, are particularly susceptible to attack by the organisms of decay and mold which are present on their irregular surfaces. Such organisms generally gain access to the fruit or vegetable through injuries sustained during picking and packaging for storage and transit, and account for significant losses during marketing.

The problem of attack by mold and decay is particularly troublesome in connection with citrus fruits. Here the long periods of storage and the necessity for repeated handling in connection with processing, packing, shipping and local distribution, leads to very large losses of fruit attributable to attack by organisms. Representative of these organisms are *Penicillium digitatum* and *Penicillium italicum*, the causative agents of blue and green mold on citrus, and *Diplodia natalensis* and *Phomopsis citri*, which attack the fruit through the button or stem-end to bring about a condition known as stem-end rot or decay. The destructive effects of such organisms are noted in a substantial portion of each crop shipped to market.

Many materials have been proposed and used with varying success for the suppression of mold, rot and decay on fruits and vegetables. Although some fungicides are very active in controlling blue and green molds, their use has been necessarily limited due to their inability to protect against rot and decay. Other materials have been unsatisfactory due to their tendency to impart an unpalatable taste to the vegetables or fruit treated therewith. A particular disadvantage of still other materials has been their tendency to harm or injure the rind or skin of the fruit or vegetable so that the produce becomes discolored, spotted or withered. The need for an inexpensive and effective method for the treatment of fruits and vegetables to prevent the development of mold and decay is well recognized, as these constitute major problems confronting today's agricultural and distribution and marketing industries.

It is an object of the present invention to provide a method for treating fresh fruits and vegetables after harvesting to accomplish protection against mold and decay. A further object is to provide a method for suppressing the growth of the organisms of mold and decay which does not burn or injure the fruit or vegetable. A further object is the provision of a method which does not impart an unpalatable taste to the treated produce. A particular object is to provide a method for suppressing the development of mold and decay on and in citrus fruit. Still other objects will become apparent from the following specification and claims.

According to the present invention, it has been discovered that certain halopropionaldehydes may be used in the treatment of fresh fruits and vegetables for the purpose of preventing the growth of the organisms of mold and decay. More particularly, it has been discovered that mold and decay on fresh fruits and vegetables may be suppressed by exposing the produce to the vapors of $\alpha,\beta$-dibromopropionaldehyde or $\alpha,\beta$-dichloropropionaldehyde in the amount of at least about 0.1 pound per 1000 cubic feet of air or other inert gas. These dihalopropionaldehydes are relatively volatile, non-inflammable liquid materials, which are somewhat soluble in many organic solvents. They possess strong and persistent lachrymating properties which enable them to serve as their own warning agents. Exposure to the vapors of these compounds not only kills the molds but also the reproductive fungal spores present upon the irregular surfaces of the fruit or vegetable. In the amounts required for the control of decay and mold, the halopropionaldehydes do not impart any unpalatable taste or burn or otherwise injure the fruit or vegetable.

The exact amount of halopropionaldehyde employed will vary somewhat with the organisms to be controlled, the conditions of humidity and temperature at time of treatment, and the particular fruit or vegetable concerned. Thus, some organisms are more resistant than others. Also, at high temperature and humidity somewhat less of the active fumigant is required than otherwise. Some fruits and vegetables will tolerate much higher vapor concentrations of fumigant than others without "burning" or being otherwise injured. Similarly, tendencies to absorb undesirable quantities of the fumigant vary from fruit to fruit and vegetable to vegetable.

In the preferred embodiment of the invention wherein citrus and particularly oranges are treated, an amount of from 0.1 to 4.0 pounds of the halopropionaldehyde per 1000 cubic feet of treating gas or vapor has been found to give good results.

In carrying out the present invention, the fruit or vegetable may be exposed to the vapors of the halopropionaldehyde toxicant in any convenient manner. In one procedure, baskets of freshly picked produce are placed in an enclosure together with the required amount of halopropionaldehyde toxicant. To facilitate the volatilization of the toxicant, it is generally introduced into the enclosure in shallow pans or sprayed or otherwise distributed upon the floor, walls or other surfaces within the enclosure. In any such distribution, actual contact between the unvolatilized toxicant and produce should be avoided. If desired, the halopropionaldehyde may be dissolved or otherwise incorporated in an inert volatile organic solvent such as acetone and the resulting mixture introduced into the treating chamber as described. The agent readily volatilizes from the surfaces upon which it is distributed to provide the required concentration of at least about 0.1 pound per 1000 cubic feet of air. If desired, the exposure may be carried out in some other inert gas than air. In large treating enclosures more rapid vaporization of the toxic halopropionaldehydes and better penetration thereof are obtained, when the atmosphere in the enclosure is kept in motion with a fan or similar device.

In another procedure, the treatment of the fruit or vegetable may be carried out after the produce has been coated with a permeable wax film to minimize shrinkage by evaporation of water, or after it has been waxed, conventionally wrapped in paper, crated and otherwise prepared for shipment to market. The halopropionaldehydes as employed in the present method penetrate such packaged produce to suppress the development of the organisms of mold and decay.

According to the present method, the fruit or vegetable is generally exposed to the required concentration of halopropionaldehyde vapors for a period of at least two hours or longer, the exact period of exposure depending upon the particular produce concerned, the nature and size of the treating chamber and the ease with which the vapors may penetrate the containers or come in contact with the produce. In small enclosures, exposures of from a few minutes to a few hours may be sufficient for the killing of the molds and spores upon the fruit or vegetable surfaces. With large enclosures and waxed, wrapped and crated produce, periods up to 48 hours or longer may be required in order to suppress the development of mold and decay. If desired, the fruit or vegetable may be exposed to the required minimum concentrations of halopropionaldehyde vapors over long periods of time without danger of injury. For example, the halopropionaldehyde vapors may be introduced into box cars packed with the crated oranges, the cars sealed and thereafter shipped to market. Such treatment suppresses the development of mold and decay during the transit period.

The following examples illustrate the invention but are not to be construed as limiting the same.

*Example 1*

α,β-dichloropropionaldehyde was employed for the control of green mold on Valencia oranges. In such operations, a number of ripe oranges were subjected to scarification to permit the easy establishment of fungal infections. The exterior surface of each orange was thereafter wetted with an aqueous dispersion of the spores and mycelia of a culture of *Penicillium digitatum*. Following the inoculation, the fruit was separated into several equal portions, and the portions placed in different enclosures. Varying amounts of an acetone solution containing 36.2 grams of the dichloropropionaldehyde per liter of solution were then separately distributed upon an absorbent paper mat in each enclosure and the enclosures sealed. In a control operation, scarified and inoculated, and unwounded and uninoculated Valencia oranges were also placed in enclosures and the enclosures sealed for the period of incubation, but without treatment with the dichloropropionaldehyde.

After five days' incubation at room temperature, the oranges were examined for mold growth and injury. Juice samples from the oranges which had been exposed to the propionaldehyde vapors were compared as to flavor by about twelve different observers, with juice samples from the unwounded and uninoculated controls. The dosages at which the dichloropropionaldehyde was employed, percentage controls of mold growth, amount of fruit injury and the flavor ratings are set forth in the following table:

| Pounds of toxicant per 1,000 cubic feet of air | Percent control of mold growth | Fruit injury | Flavor rating |
|---|---|---|---|
| 0.22 | 100 | None | Same as unscarified untreated checks. |
| 0.55 | 100 | ---do--- | Do. |
| 1.10 | 100 | ---do--- | Do. |
| 2.20 | 100 | ---do--- | Do. |

Following the incubation period, the untreated but wounded and inoculated check oranges were examined and found to be heavily overgrown with green mold.

*Example 2*

In a similar operation, α,β-dibromopropionaldehyde was employed for the control of green mold on Valencia oranges. The dibromopropionaldehyde was distributed in the treating enclosures in the form of an acetone solution containing 36.2 grams of the aldehyde per liter of solution. After five days incubation at room temperature, the oranges were examined for mold growth and injury, and comparison made as to flavor. The following table sets forth the dosages at which the propionaldehyde was employed, percentage control of mold growth, amount of fruit injury and the flavor ratings:

| Pounds of toxicant per 1,000 cubic feet of air | Percent control of mold growth | Fruit injury | Flavor rating |
|---|---|---|---|
| 0.22 | 100 | None | Same as unscarified untreated checks. |
| 0.55 | 100 | ---do--- | Do. |
| 1.10 | 100 | ---do--- | Do. |

The untreated but scarified and inoculated oranges were found to be heavily overgrown with *Penicillium digitatum* at the end of the incubation period.

*Example 3*

In like manner, other oranges were prepared, inoculated, placed in enclosures and exposed at various dosages to the vapors of α,β-dichloropropionaldehyde. The aldehyde was distributed in the treating enclosures in the form of an acetone solution containing 90 grams of toxicant per liter of solution. After 5 days' incubation at room temperature the oranges were examined for mold growth and injury, and comparisons made as to flavor. The following table sets forth the results obtained:

| Pounds of toxicant per 1,000 cubic feet of air | Percent control of mold growth | Fruit injury | Flavor rating |
|---|---|---|---|
| 0.66 | 100 | None | Same as unscarified untreated checks. |
| 1.32 | 100 | ...do... | Do. |
| 2.64 | 100 | ...do... | Do. |

The untreated but scarified and inoculated oranges were found to be heavily overgrown with *Penicillium digitatum* at the end of the incubation period.

*Example 4*

In a further operation, a number of ripe Florida oranges were subjected to scarification and the exterior surface of each orange thereafter thoroughly inoculated with an aqueous dispersion of the spores and mycelia of a mixed culture of citrus mold and decay organisms including *Phomopsis citri* and *Penicillium digitatum*. The inoculated oranges were left overnight at room temperature to permit the establishment of the organisms. A portion of the fruit was then placed in an enclosure and subjected for 14 days to the vapors of about 0.5 pound of α,β-dichloropropionaldehyde per 1000 cubic feet of air. In a control operation, scarified and inoculated oranges were also placed in sealed enclosures and stored at room temperature, but without treatment.

At the end of the exposure period, the treated fruit was examined and a 100 percent control of organism growth observed without evidence of substantial injury of the fruit from the described treatment. In contrast, the control oranges were found to be heavily overgrown with the complex of mold and decay organisms.

*Example 5*

In like manner, other Florida oranges were scarified, inoculated, incubated and thereafter subjected for about 6 days to the vapors of about 0.1 pound of α,β-dichloropropionaldehyde per 1000 cubic feet of air. At the end of the exposure period, the treated fruit was examined and a 70 percent suppression of mold and decay observed without evidence of injury due to the described treatment. In contrast, untreated check oranges were found to be heavily overgrown with the organisms employed in the inoculation.

*Example 6*

Apples, plums and tomatoes are similarly exposed for about six hours to the vapors of about 0.1 pound of α,β-dichloropropionaldehyde per 1000 cubic feet of air. This treatment gives markedly good controls of mold and decay during the distribution and marketing period.

I claim:

1. A process for treating fresh fruits and vegetables to suppress the development of mold and decay, which comprises exposing such produce to the vapors of an aldehyde in the amount of at least 0.1 pound per 1000 cubic feet of an inert gas, the aldehyde being a member of the group consisting of α,β-dibromopropionaldehyde and α,β-dichloropropionaldehyde.

2. A process for treating fresh citrus fruit to suppress the development of mold and decay, which comprises exposing the fruit to a composition comprising from about 0.1 to 4 pounds of α,β-dibromopropionaldehyde per 1000 cubic feet of air.

3. A process for treating fresh citrus fruit to suppress the development of mold and decay, which comprises exposing the fruit to a composition comprising from about 0.1 to 4 pounds of α,β-dichloropropionaldehyde per 1000 cubic feet of air.

LLOYD J. MEULI.

No references cited.